United States Patent [19]
Cheeseman et al.

[11] Patent Number: 5,887,106
[45] Date of Patent: Mar. 23, 1999

[54] MANAGEMENT OF OPTICAL FIBER

[75] Inventors: Eric W. Cheeseman, Seven Oaks; Edward K. George, Rainham; Pauline S. Smith, Hockley, all of United Kingdom

[73] Assignee: Telephone Cables Limited, United Kingdom

[21] Appl. No.: 829,416

[22] Filed: Mar. 31, 1997

[30]       Foreign Application Priority Data

Apr. 12, 1996 [GB] United Kingdom ............. 9607609
Sep. 23, 1996 [GB] United Kingdom ............. 9619828

[51] Int. Cl.⁶ ............................................. G02B 6/36
[52] U.S. Cl. ............................................. 385/135
[58] Field of Search ............................ 385/134, 135

[56]              References Cited

U.S. PATENT DOCUMENTS

| | | | |
|---|---|---|---|
| 4,266,853 | 5/1981 | Hutchins et al. | 385/135 |
| 4,373,776 | 2/1983 | Purdy | 385/135 |
| 4,770,357 | 9/1988 | Sander et al. | 385/135 |
| 4,832,436 | 5/1989 | Goto et al. | 385/135 |
| 4,913,522 | 4/1990 | Nolf et al. | 385/135 |
| 5,071,220 | 12/1991 | Ruello et al. | 385/135 |
| 5,323,478 | 6/1994 | Milanowski et al. | 385/135 |
| 5,363,466 | 11/1994 | Milanowski et al. | 385/135 |
| 5,402,515 | 3/1995 | Vidacovich et al. | 385/135 |
| 5,446,822 | 8/1995 | Keith | 385/135 |
| 5,479,553 | 12/1995 | Daems et al. | 385/135 |
| 5,497,444 | 3/1996 | Wheeler | 385/135 |

FOREIGN PATENT DOCUMENTS

| | | |
|---|---|---|
| 61122/86 | 2/1987 | Australia . |
| 0 216 073 A1 | 4/1987 | European Pat. Off. . |
| 0 333 316 A2 | 9/1989 | European Pat. Off. . |
| 0 408 266 A2 | 1/1991 | European Pat. Off. . |
| 2 305 739 | 4/1997 | United Kingdom . |
| WO 94/18590 | 8/1994 | WIPO . |
| WO 94/23324 | 10/1994 | WIPO . |
| WO 95/07484 | 3/1995 | WIPO . |
| WO 96/10203 | 4/1996 | WIPO . |

*Primary Examiner*—Hung N. Ngo
*Attorney, Agent, or Firm*—Kirschstein, et al.

[57]              ABSTRACT

A drawer for a fibre management cabinet has a number of splice cassettes mounted on it by means of hinges. Each cassette hold a single splice. Fibres leading into a splice cassette are fed through the hinges of that splice cassette.

20 Claims, 2 Drawing Sheets

MANAGEMENT OF OPTICAL FIBER

BACKGROUND OF THE INVENTION

This invention relates to cable management and in particularly, but not exclusively, related to management of optical fibre splices.

As the penetration of optical fibre into networks increases, greater concentrations of fibre splices occur. This applies at head ends of systems, for example telephone exchanges or other exchanges, where cabled or otherwise packaged fibre is broken out into connectors. In such applications large numbers of fibres, and thus of fibre splices, may be present and careful management of the fibre is required. Similar requirements apply in non-fibre environments such as copper. In the case of fibre, the need to minimise bending losses can lead to fibre management systems being rather bulky. Conversely there is also a need to provide management systems which are compact.

SUMMARY OF THE INVENTION

It is an object of the present invention to provide better management of fibre.

It is another object of the present invention to provide better management of optical fibre components, particularly optical fibre splices.

According to a first aspect the invention provides apparatus for managing a plurality of optical components comprising a plurality of cassettes for holding at least one optical component at least one cassette being moveable about a pivot axis of a hinge in which fibre is passed into the cassette through the hinge.

Preferably the optical components are splices. Alternatively they may be couplers, filters or other components or devices. The apparatus may manage components of different types, such as a combination of splices and couplers.

The term cassette includes a tray which is capable of holding an optical component.

Preferably the or each cassette is adapted to hold at least one optical component. Most preferably the or each cassette is adapted to hold only one optical component and there may be a sole pair, or circuit, of fibres per tray. Such an embodiment is particularly, but not exclusively, suitable for cable television. Alternatively the or each cassette may hold a number of optical circuits. The number of fibres entering a cassette may be different from the number of fibres leaving a cassette.

The or each cassette may flip over. Preferably the or each cassette is moveable from a first position in which it may be flat or nearly so to a second position in which it may be flat or nearly so. The or each cassette may rotate about an axis by up to 180°. Of course, a particular cassette may only lie flat or nearly so if it is not restricted from doing so by the presence of another cassette.

Preferably the or each cassette is supported on a support means. The support means may be a drawer. The support means may have a row or rows of connector adapters at an end. At least one cassette may house a splice between a connector pigtail and an uncabled fibre.

The support means may support a plurality of cassettes arranged in a row. When flat a cassette may overlie, to an extent, a cassette adjacent to it. This provides a compact arrangement and, importantly, a flat arrangement. This is useful if the apparatus is in the form of a fibre management cabinet comprising a plurality of drawers, one above another.

Preferably the fibre is passed into the or each cassette through at least one hinge pin. The or each hinge pin may be hollow. Preferably the or each hinge pin is flexible. Most preferably there are two hinge pins. In an embodiment having a cassette with two hollow hinge pins, each pin may guide fibres into the cassette from opposite directions. The or each hinge pin may not necessarily be tubular but may have an open channel, or slot running along its length. An advantage of guiding fibre substantially along the pivot axis through the hinge is that it is located on a "neutral axis" when a cassette is moved about its hinge. This minimises disturbance of the fibre and consequently the possibility of bending loss. Another advantage is that two fibres to be spliced are naturally introduced across a lower part of the cassette. This is very convenient for organising the fibre in the cassette.

Preferably at least one cassette comprises a mandrel around which fibre may be arranged and stored. At least one cassette may comprise an envelope, which has a base, a peripheral wall and a lip or flange extending from the peripheral wall and overlying the base. Preferably the flange has one or more fibre retainers which rest on the mandrel. Preferably the or each retainer is resilient. It may be a thin flexible member. It may be planar. The or each retainer may be sufficiently flexible to enable it to be pulled from contact with the mandrel, thus allowing a fibre to be slipped between it and the mandrel. On release of the or each retainer it may spring back to rest on the mandrel.

Preferably at least one cassette comprises a means for holding an optical component.

Preferably one or more of the cassettes are vacuum formed. Vacuum formed cassettes may have a one-piece construction comprising two halves. The two halves may be connected together by at least one fastener. The or each fastener may be mechanical such as a snap fit or a popper, for example a button which is an interference fit in a recess. Preferably there are a plurality of fasteners. Preferably the or each fastener is releasable.

The vacuum formed cassettes may be assembled by bending one of the halves about a fold line to register with the other of the halves and then fastening the two halves together. This operation may also form one or more parts of the hinge which receive a hinge pin.

A vacuum formed construction is cheap to manufacture and may be lightweight. Although it is made out of material which is perceived to be flimsy, the resultant cassette is rigid enough for its purpose. The inventors of the present invention have realised that very rigid splice trays are not essential to fibre management.

BRIEF DESCRIPTION OF THE DRAWINGS

An embodiment of the invention will now be described, by way of example only, in which.

DETAILED DESCRIPTION OF THE PREFERRED EMBODIMENTS

Figure 1:
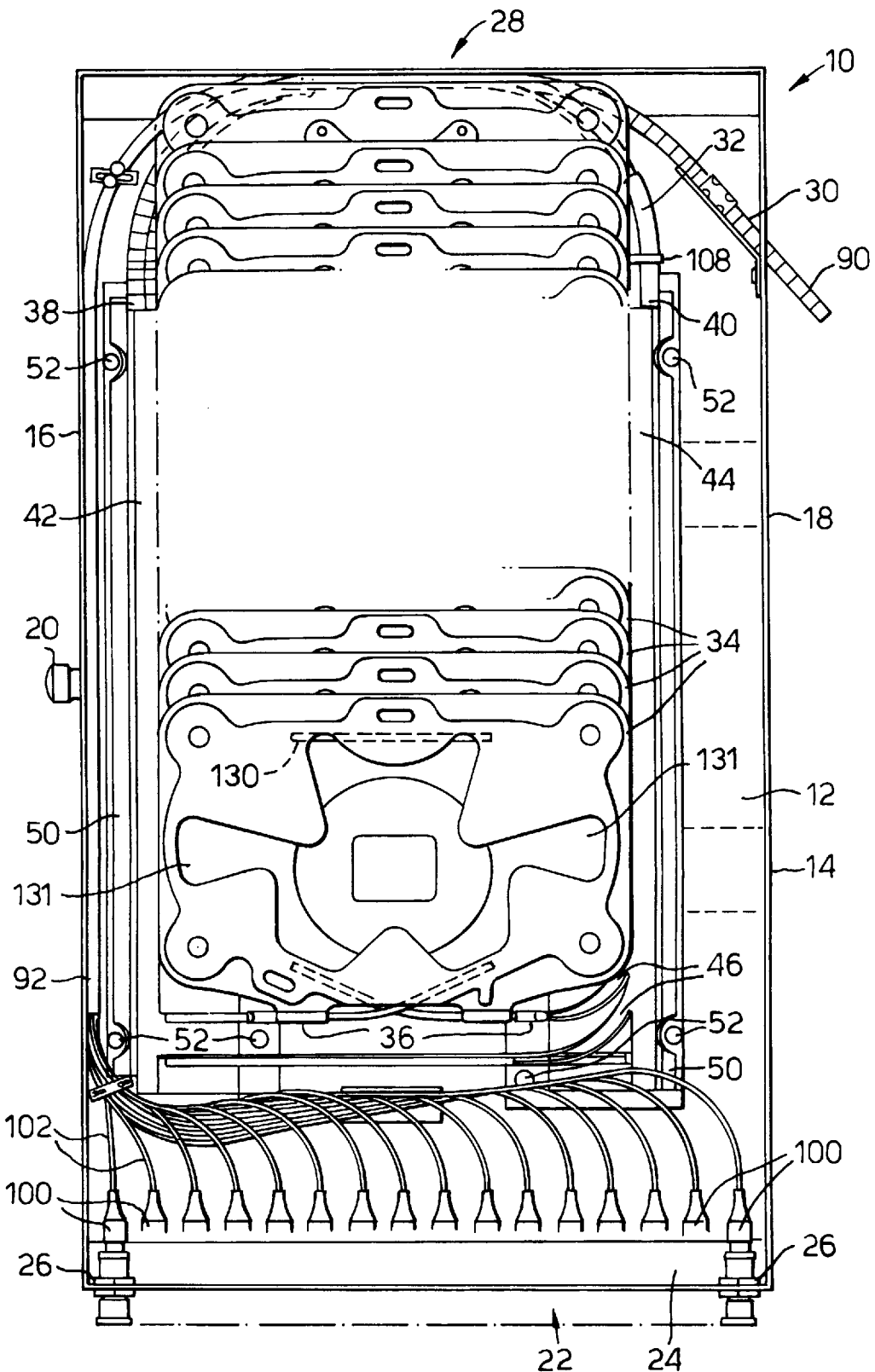
FIG. 1 shows a plan view of a number of splice cassettes arranged in a drawer.

FIG. 1 shows a drawer 10 which is part of a fibre management system. The fibre management system is a cabinet comprising a plurality of drawers 10 which can each be slid out of the cabinet for access.

The drawer 10 is a flat tray having a base 12 and peripheral wall 14. The drawer 10 has a front wall 16 and a back wall 18. A knob 20 is used to pull the drawer 10 out of the cabinet.

At one side wall 22 is a wall 24 of connector adaptors 26. Although only two adaptors 26 are shown there will be an adaptor for each connector. At the other side wall 28 is a tubular fibre guide 30, which is arranged in a roughly semi-circular manner.

Located on the base 12 is a set of sixteen splice cassettes 34 which are mounted by means of hinges 36. Of course, any number of splice trays may be held in a drawer. The splice trays 34 may all adopt a configuration in which they lie down all pointing towards the side wall 28 as shown in FIG. 1. Alternatively one or more of the splice trays 34 may be moved about its hinge 36 and point towards the side wall 22. That is, one or more of the splice trays may be flipped over in order to allow access to a particular splice.

The tubular fibre guide 30 has an open end 38 from which fibre may emerge into a fibre guiding channel 42 which extends along the base 12 in a direction generally parallel to the front wall 16 of the drawer 10. There is a tubular fibre protection sleeve 32 which guides pigtails through an open end 40 into a fibre guiding channel 44.

Figure 4:
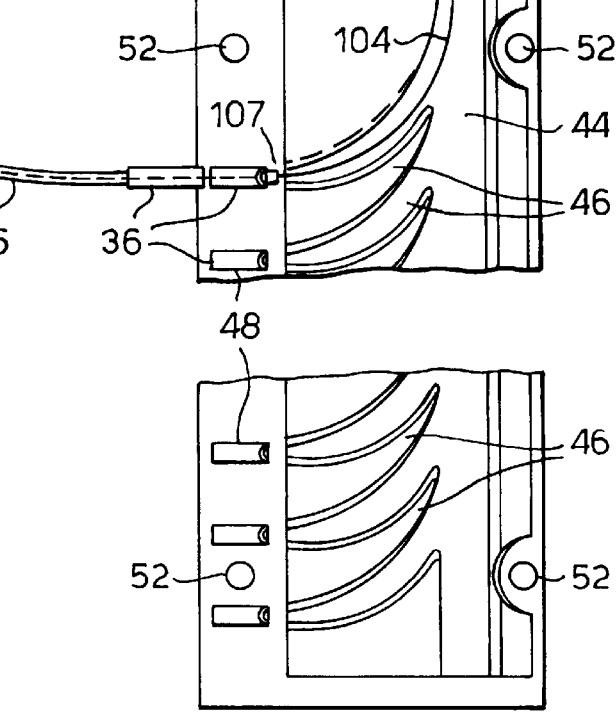
FIG. 4 shows a fibre guiding channel for the drawer of FIG. 1.

Along part of the length of the fibre guiding channels 42, 44, there are guide formations 46 at positions which correspond to hinges 36 of respective splice cassettes 34. These are shown in FIG. 4. This also shows that the fibre guiding channel 44, guide formations 46 and hinge elements 48 are all formed on a single vacuum formed integral piece 50 which is mounted on the base 12 by means of fixings 52. A similar piece 50 forms the guide channel 42. A pair of the pieces 50 comprises a means for hingeably connecting the splice cassettes 34 to the base 12.

Figure 2:
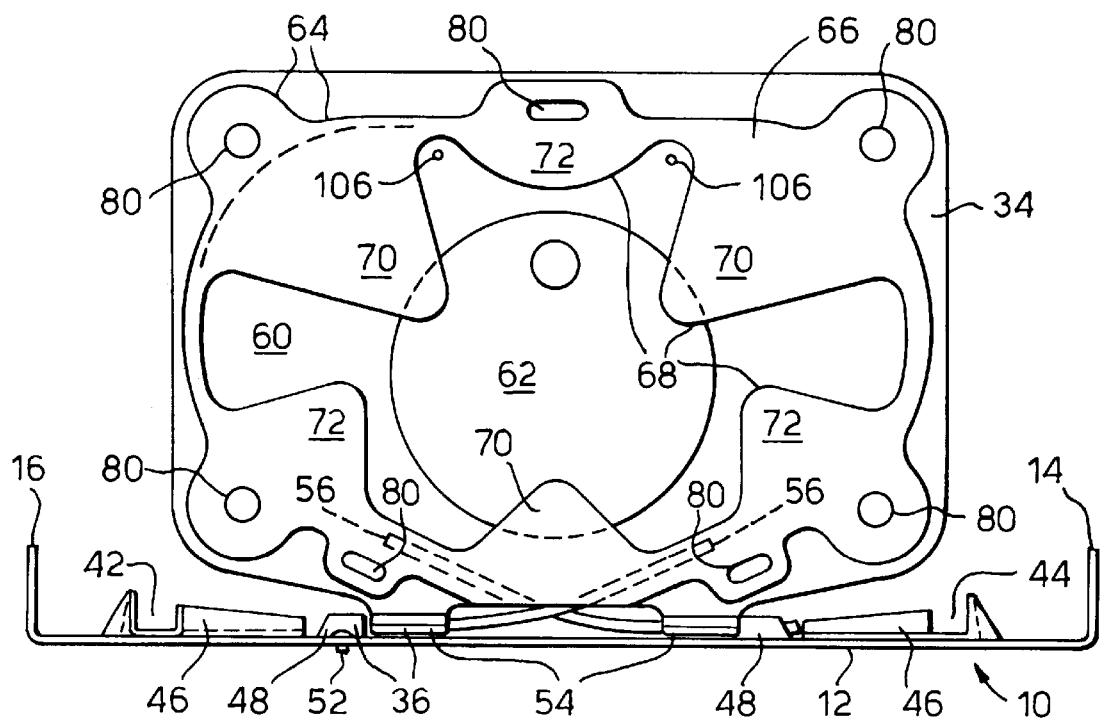
FIG. 2 shows one of the splice cassettes of FIG. 1.

Another view of the drawer 10 is shown in FIG. 2. This shows a cross-sectional view of the drawer 10, looking along the base 12, with one of the splice cassettes 34 upstanding.

The splice cassette 34 has hinge formations 54 which are connected to the hinge elements 48 by means of hollow hinge pins 56. The function of the pins 56 is twofold, they complete the hinge 36 and also serve as fibre guides to introduce fibre from guide formations 46 into splice cassettes 34. The splice cassette 34 has a generally planar base 60 from which extends a mandrel 62. A peripheral wall 64 extends around the base 60 and is upstanding therefrom. An irregular lip 66 extends from the top of the peripheral wall 64 in towards the mandrel 62. Parts of the lip 66 which extend across the base 60 and in towards the mandrel 62 form retainers 68 for holding fibre in the splice cassette 34 in a region or envelope formed between the base 60, the peripheral wall 64 and the retainers 68. Some retainers 70 extend up to and partially overlap the mandrel 62 whereas others 72 do not reach the mandrel 62. The retainers 70 bear against an upper planar surface of the mandrel 62.

The hinge pins 56 are anchored into the hinge elements 48 without adhesive. Rather than being drilled, holes to receive the hinge pins are pierced in a blank end of the hinge element with a spike. This creates a hole which is of a suitable size to receive a hinge pin 56. Shortly after piercing has occurred, the hinge pin 56 will fit readily into the hole in the hinge element 48. However, after piercing the pierced and deformed plastic of the hinge element 48 relaxes, contracts and pinches the hinge pin 56 to hold it in place. For manufacturing purposes it is convenient if all the hinge formations 48 in a single piece 50 can be pierced at the same time. It is not essential for hinge pins to be inserted immediately after piercing. A pierced piece may be stored until needed and then hinge pin receiving holes prepared with a blunt sizing tool. Advantages of this method are that no adhesive is required, the holes do not need to be formed by drilling or moulding (thus avoiding problems with manufacturing tolerances), and that the hole forming and hinge pin fixing procedures are relatively quick.

The hollow hinge pins 56 are flexible enough to flex in response to bending of fibre, for example when fibre is being worked upon.

The shape and height of the formations 46 are chosen so as to ease the entry (at 107) of the fibre ends into the hollow hinge pins 56. Grooves in the formations 46, which guide fibre to an end of a hollow hinge pin 56, guide fibre neatly into the centre of the hollow end of the hinge pin. Thus the formations accommodate a wide angle of fibre end approach.

Each splice cassette is integrally formed as a single piece by vacuum forming. The single piece has a first half comprising the base 60, the mandrel 62, and the peripheral wall 64 and a second half comprising a region which also forms part of the peripheral wall 64 and the lip 66. The first and second halves are joined together about a fold region. The splice cassette is assembled by moving the second half about the fold region to register with the first half and then snapping the two halves together. The halves are provided with complementary snap fasteners having a button on one half which snaps into a recess on the other half where it is held by a mechanical interference fit. The snap fasteners are denoted by numerals 80 on FIG. 2.

Figure 3:
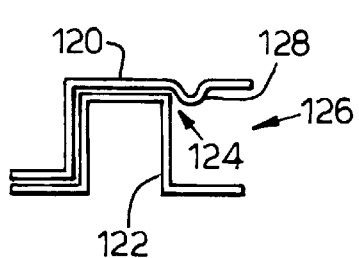
FIG. 3 shows a cross sectional view through the peripheral wall of a splice cassette.

Referring now to the cross-sectional view shown in FIG. 3, since the cassette is formed by snapping together first 120 and second 122 halves, there may be a gap 124 where the halves meet surrounding the region 126 in which fibre is stored in the cassette. It is desirable to prevent fibre from sliding into this gap 124 because any disturbance of the cassette could pinch the fibre and cause transient losses. Surprisingly it has been found that if a ridge 128 is provided adjacent to the gap it substantially prevents fibre from slipping into the gap. This is not simply because it is a mechanical barrier, but because localised regions of fibre extending over the ridge cannot get into the gap unless all of the neighbouring fibre has adopted a configuration allowing it to fit snugly into the gap in one go. This is because the fibre would have to deform locally to enter the gap, and it cannot do this because in its relaxed position it forms a smooth loop.

Moving the first and second halves into register causes the fold region to bend into a loop which forms hinge formations 54 for each splice cassette 34. Furthermore, the first and second halves are releasable from each other. Snapping the first and second halves together may also serve as a step in the construction of the drawer. For ease of assembly, before the halves of the splice cassette 34 are snapped together they are placed between hinge elements 48 into which have been placed hollow pins 56. It may be snapping of the first and second halves together which locates the hollow pins 56 in the hinges 36. In this way the drawer forms its own jig during assembly. However, it is preferred to assemble the drawer with the splice cassettes already snapped together. The cassettes in a row or a stack are placed in a jig so that the hinge formations 54 are lined up and pieces 50 (already containing inserted and held hinge pins 56) are brought together on either side of the cassettes, the loose ends of the hinge pins 56 being fed into the hinge formations 54. The hinge pins 56 are usually cut pieces of a coil of plastic tube. As a result they will have a natural curve. It is convenient to rotate the hinge pin in the hinge elements 48 so that on sliding into hinge formations 56, the hinge pins will curve naturally towards the middle of the cassettes. When the pieces 50 and cassettes 34 are assembled, they can be lifted out of the jig together and, as a single assembly, placed on the base 12. The assembly is located on the base 12 so that pips which have been formed on the pieces register with holes in the base 12. The pips are pierced and the assembly and base 12, fixed together by fixings 52 which, conveniently, are press-studs. The pieces 50 are transparent so that they can be correctly positioned on the base 12 with little or no difficulty. The assembly is easy to handle in fixing it on to the base. Being relatively robust it may be stored for fixing to the base at a future time.

Since the splice cassettes are vacuum formed they may comprise a relatively inexpensive material such as PVC. As a result the splice cassettes are more lightweight and less expensive than the relatively heavy duty injection moulded splice trays which have been available hitherto.

Referring back now to FIG. 1, use of the drawer 10 will be explained. A cable or a bundle of fibres is fed to an inlet end 90 of the tubular fibre guide 30. If it is a cable, the fibre or fibres it contains would be broken out at this point to be fed into the tubular fibre guide 30. The tubular fibre guide 30 guides the fibre around the drawer 10 such that, on emerging at the end 38, the fibres enter the channel 42 from where they can be fed into individual splice cassettes 34. A fibre is fed along through formations 46 and into one of the hollow pins 56. These guide the fibres away from the front and back walls 16 of the drawer and into the interior of the splice cassettes.

Fibre is brought into the drawer 10 for the purpose of termination onto connectors for use in further interconnection. The row of adaptors 26 in the side wall 24 locates a number of connectors 100. In this embodiment a full complement of sixteen connectors 100 is shown although the row of side wall adaptors 26 may not be "full". The connectors have fibre in the form of pigtails 102 (either fully or secondary coated) which are bundled together and fed along a channel 92 before entering the tubular fibre protection sleeve 32. This is relatively short (approximately 40 mm long) and protects pigtails 102 as they pass through an anchor point 108. In FIG. 1 pigtails in the channel 92 are shown schematically. The channel 92 guides the fibre from near the corner of the front wall 16 and side wall 22 and along the front wall 16, where the pigtails 102 arc around to the side wall 28 and into the guide channel 44. In common with the guide channel 42, individual fibres are bent out of the channel 44, through guide formations 46 and into individual splice cassettes 34. Again entry into the envelope of a splice cassette 34 is via a hollow pin 56 and is made in an opposite direction to fibre entering from channel 42. FIG. 4 shows a single fibre 104 (secondary coated) being taken from the end 40 of sleeve 32 and being fed into the end 107 of the hollow pin 56.

The ends of the fibre from opposite ends can be prepared for splicing and then spliced. A resultant splice in a splice protector 130, is stored between pips 106 which extend out of the base 60 of the splice cassette 34 by pushing it underneath the retainer 72 (which is between the pips) and then over the pips such that it abuts the peripheral wall 64. The splice protector 130 is contained between base 60, wall 64, retainer 72 and pips 106.

Extra fibre length is then present as loops exiting via cut-outs 131 to the left and right of the splice cassette 34. In an operation separate for each extra fibre length, each loop is formed into a series of smaller loops by twisting and folding it and then is stored in the envelope. This is done by lifting retainers 70 in turn and placing part of the loops underneath until the loops are centralised around the mandrel 62. Each retainer 70 need be lifted only once for each extra fibre length. When released each retainer 70 springs back into contact with the mandrel 62. Once in place the retainers prevent the fibre from escaping.

When working on a pair of fibres in such a way, all of the other fibres in the drawer are completely protected and suffer the minimum disturbance. At least part of the reason for this is that the fibres are either in a respective guide channel 42, 44, internally located in a hinge 36 or in the envelope of a splice cassette. Another advantage of the fibres being internally located in a hinge 36 is that any movement of the splice cassette is at a minimum about its hinge 36. By locating fibre in the hinges they suffer least disturbance and least bending. In effect the fibre is disposed along a "neutral axis" of movement of a splice cassette. Fibres may suffer a little torsion but this is within acceptable limits. Finally, a flexible hinge pin accommodates movement of the fibre.

Clearly all of the parts of the drawer which cause the fibre to be bent are designed to bend the fibre to more than its minimum radius of curvature in order to avoid attenuation of signals.

The embodiment discussed is particularly suitable for single fibre working in which optical circuits are isolated from one another, for example in cable television.

We claim:

1. An apparatus for managing optical fibre, comprising: a plurality of cassettes, each cassette being adapted to hold at least one optical component, at least one of the cassettes having a hinge including a hinge element and a cooperating hinge pin, said at least one cassette being movable about a pivot axis of the hinge, the optical fibre passing into said at least one cassette through the hinge, and the optical fibre being movable relative to the hinge.

2. The apparatus according to claim 1, wherein each cassette is movable from a first generally flat position to a second generally flat position.

3. The apparatus according to claim 1, wherein said at least one cassette is vacuum formed.

4. The apparatus according to claim 3, wherein a plurality of the cassettes is vacuum formed, and wherein the vacuum formed cassettes comprise a one-piece construction including two halves.

5. The apparatus according to claim 4, wherein the two halves are connected together by at least one mechanical fastener.

6. The apparatus according to claim 5, wherein the vacuum formed cassettes are assembled by bending one of the halves about a fold line to register with the other of the halves, and then fastening the two halves together with said at least one mechanical fastener.

7. The apparatus according to claim 1, wherein said at least one cassette comprises an envelope which has a base, a peripheral wall, and a flange extending from the peripheral wall and overlying the base.

8. The apparatus according to claim 7, wherein the flange has at least one optical fibre retainer which rests on a mandrel.

9. The apparatus according to claim 8, wherein said at least one retainer is resilient.

10. The apparatus according to claim 8, wherein said at least one retainer is a thin flexible member.

11. The apparatus according to claim 8, wherein said at least one retainer is sufficiently flexible to enable it to be pulled from contact with the mandrel, thus allowing the optical fibre to be passed between it and the mandrel.

12. The apparatus according to claim 1, wherein the cassettes are supported on a support means.

13. The apparatus according to claim 1, wherein one of the cassettes overlies, to an extent, a splice cassette adjacent to it.

14. The apparatus according to claim 1, wherein said at least one optical component is a splice.

15. The apparatus according to claim 14, wherein each cassette is adapted to hold only one splice and a sole pair of optical fibres.

16. The apparatus according to claim 1, wherein said at least one optical component is a coupler.

17. The apparatus according to claim 1, wherein the optical fibre passes through the hinge in a direction substantially parallel to the pivot axis.

18. The apparatus according to claim 1, wherein the optical fibre is fed through the hinge pin.

19. The apparatus according to claim 18, wherein the hinge pin from said at least one cassette is flexible.

20. The apparatus according to claim 1, wherein the apparatus is constructed as an optical fibre management cabinet.

* * * * *